United States Patent Office 2,932,650
Patented Apr. 12, 1960

2,932,650

2-6-DIAZABICYCLO(3.3.0) OCTANES

Arthur C. Cope, Belmont, Mass., and Tsung-Ying Shen, Metuchen, N.J.

No Drawing. Application November 19, 1957
Serial No. 697,305

6 Claims. (Cl. 260—313)

This invention relates to compounds having the following structures:

D-2,6-diazabicyclo(3.3.0)octane

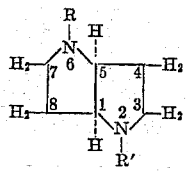

D-X

L-2,6-diazabicyclo(3.3.0)octane

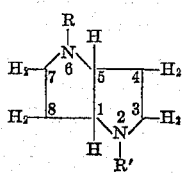

L-X

The invention also includes their methods of preparation.

In the above compounds R and $R^1$ stand for hydrogen, or a lower alkyl radical of one to four carbon atoms which may or may not carry a phenyl or a hydroxy radical.

The starting compound for D-X is L-1,6-dibromohexane-3,4-diol ditosylate

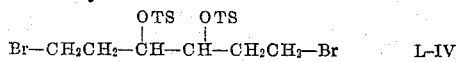

L-IV the preparation of which is disclosed and claimed in our application filed herewith entitled 2,6-dioxabicyclo-(3.3.0)octanes, Serial No. 697,307, filed on November 19, 1957, now abandoned, and referred to therein as compound L-IV.

Briefly stated the compound L-IV is obtained from compound D-IV, the preparation of which is hereafter summarized. Starting with D-IV, the addition of tetraethylammonium acetate produces the following compound:

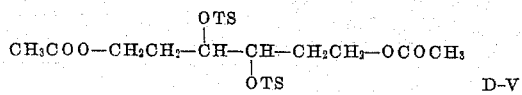

D-V

Reaction of D-V with cold sodium methoxide produces the following compound:

L-2,6-dioxabicyclo (3.3.0) octane

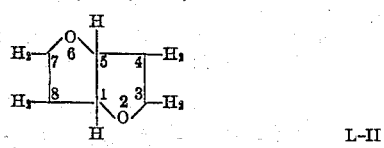

L-II

Compound L-II is converted to L-III by treatment with anhydrous hydrogen bromide at room temperature:

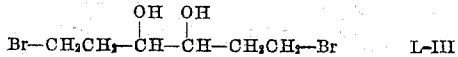

L-III

By the addition of p-toluenesulfonyl chloride L-III is converted to L-IV:

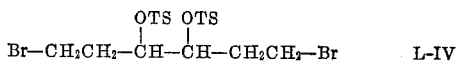

L-IV

The starting compound for L-X is D-1,6-dibromohexane-3,4-diol ditosylate

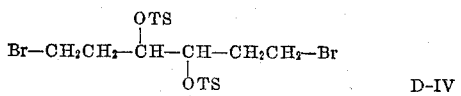

D-IV the preparation of which is disclosed and claimed in said application filed herewith, in which it is referred to as compound D-IV. The starting material for D-IV is D-isomannide dichloride.

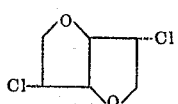

I

Catalytic hydrogenation of I gives compound D-II

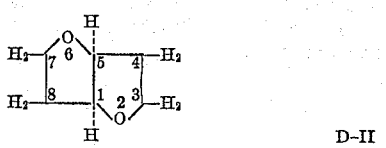

D-II

Compound D-II is treated with anhydrous hydrogen bromide at room temperature to produce compound D-III:

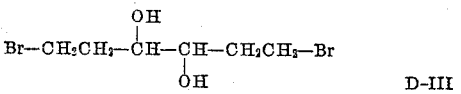

D-III

D-III is converted to its ditosylate D-IV by treatment with p-toluenesulfonyl chloride:

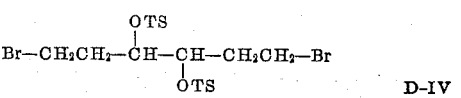

D-IV

The compounds of the invention are obtained by treating the dibromo ditosylate D or L-IV with amines. By using D-IV and n-butylamine, L-2,6-di-n-butyl-2,6-diazabicyclo(3.3.0)octane (L-VII) was obtained in 89% yield.

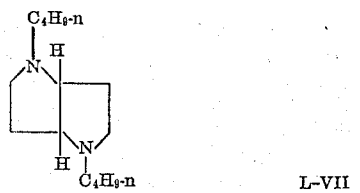

L-VII

The corresponding D-2,6-di-n-butyl derivative is obtained by starting with L-IV.

The corresponding dimethyl compound L-VIII was prepared in 57% yield from methylamine and D-IV.

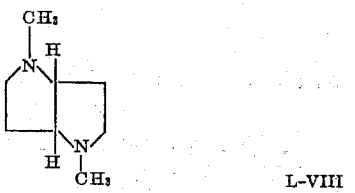

L-VIII

To obtain the D form of L-VIII, the methylamine is combined with L-IV.

D and L-2,6-dibenzyl-2,6-diazabicyclo(3.3.0) octane (D and L-IX) were obtained in 66 and 72% yield, respectively, with benzylamine.

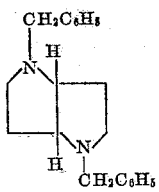

L-IX

In all cases the assignments of configuration were based on the assumption of Walden inversions in the ring closure step, and the stereospecificity of this reaction was further demonstrated by the optical purity of the D and L enantiomorphs which showed identical but opposite optical rotations.

The unsubstituted diamine L-X, supra when R=H, M.P. 27.5°, $[\alpha]_D$ −43.2°, was obtained from L-IX in 75% yield by hydrogenolysis in the presence of a palladium catalyst. The compound D-X, supra when R=H is obtained in similar manner from D-IX.

The monobenzyl compound L-XI, M.P. 12–15°, was obtained as one of the products when the hydrogenolysis of L-IX was interrupted at an intermediate stage. Similarly the diamino glycol L-XII was synthesized by the reaction of D-IV with ethanolamine in 44% yield. It was converted to its dibenzoate dihydrochloride in the usual manner.

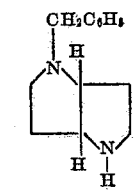

L-XI

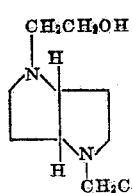

L-XII

The invention will be further clarified by reference to the following examples.

*Example 1*

L - 2,6 - di - n - butyl - 2,6 - diazabicyclo(3.3.0)octane (L-VII).—To a solution of 10.0 g. of D-IV in 100 ml. of dioxane at the reflux temperature was added slowly 7.5 g. of n-butylamine over a period of 30 minutes. After refluxing for 2 hours the solution was diluted with 300 ml. of water and extracted four times with 100-ml. portions of ether. The combined extracts were washed with 30 ml. of water, dried over potassium carbonate, concentrated, and fractionated through a semi-micro column. The product (L-VII) was obtained in a yield of 3.42 g. (89%), B.P. 84° (0.3 mm.), $n_D^{25}$ 1.4685, $[\alpha]_D^{25}$ 62.5° (C, 2.6, CHCl$_3$).

*Analysis.*—Calcd. for C$_{14}$H$_{28}$N$_2$: C, 74.91; H, 12.56; N, 12.49. Found: C, 75.00; H, 12.44; N, 12.51.

L-2,6-di-n-butyl-2,6-diazabicyclo(3.3.0)octane dipicrate was prepared from L-VII and picric acid in ether was recrystallized from ethanol as plates, M.P. 163.2–164.2°.

*Analysis.*—Calcd. for C$_{17}$H$_{34}$O$_{14}$N$_8$: C, 45.74; H, 5.02; N, 16.42. Found: C, 45.87; H, 5.26; N, 16.53.

*Example 2*

L - 2,6 - dimethyl - 2,6 - diazabicyclo(3.3.0)octane (L-VIII).—A stream of dry methylamine was introduced into a refluxing solution of 17.5 g. of D-IV in 100 ml. of dioxane during a period of 2 hours. The solution was refluxed for another hour and allowed to stand at room temperature overnight. After filtration, the solution was concentrated and fractionated through a semi-micro column, yielding 2.42 g. (56%) of the diamine L-VIII, B.P. 88° (16 mm.), $n_D^{25}$ 1.4673.

*Analysis.*—Calcd. for C$_8$H$_{16}$N$_2$: C, 68.53; H, 11.50; N, 20.00. Found: C, 68.31; H, 11.51; N, 19.76.

L-2,6-dimethyl-2,6-diazabicyclo(3.3.0)octane methiodide was prepared from a solution of the diamine L-VIII in ether and excess methyl iodide at room temperature. The precipitate that formed was recrystallized from ethanol as long prisms, M.P. 226.8–227.2°.

*Analysis.*—Calcd. for C$_9$H$_{19}$N$_2$I: C, 38.30; H, 6.74; N, 9.92. Found: C, 37.88; H, 6.64; N, 9.60.

*Example 3*

L-2,6-dibenzyl-2,6-diazabicyclo(3.3.0)octane (L-IX).—A solution of 5.0 g. of D-IV in dioxane was treated with 5.5 g. of benzylamine in a manner similar to the one described above for n-butylamine. The product was collected at 155–170° (0.5 mm.), and crystallized on cooling, M.P. 32–34°. The yield was 1.85 g. (72%). The product was recrystallized from aqueous methanol as needles, M.P. 37.5–38.0°, $[\alpha]_D^{25}$ 62.7° (C, 1.8, CHCl$_3$).

*Analysis.*—Calcd. for C$_{20}$H$_{24}$N$_2$: C, 82.15; H, 8.29; N, 9.58. Found: C, 82.36; H, 8.45; N, 9.49.

L-2,6-dibenzyl-2,6-diazabicyclo(3.3.0)octane dipicrate was prepared from the diamine and picric acid in ether and recrystallized from ethanol; M.P. 207.5–208.0° (dec.).

*Analysis.*—Calcd. for C$_{32}$H$_{30}$O$_7$N$_8$: C, 51.25; H, 4.02; N, 14.95. Found: C, 51.04; H, 4.31; N, 15.06.

*Example 4*

L-2,6-diazabicyclo(3.3.0)octane (L-X).—A solution of 7.5 g. of L-VIII in ethanol was hydrogenolyzed in the presence of 3 g. of 5% palladium on Norit catalyst at 60° with stirring. After 17 hours two moles of hydrogen had been absorbed, and the solution was filtered and concentrated. The residue was fractionated through a semi-micro column, yielding 2.2 g. (75%) of the diamine L-X, B.P. 53° (0.8 mm.), $n_D^{25}$ 1.5070–1.5084. The product was purified by redistillation: B.P. 40° (0.5 mm.) $n_D^{25}$ 1.5082, M.P. 27.5–28.0°, $[\alpha]_D^{25}$ −37.0° (C, 2.5, H$_2$O); −43.2° (C, 2.2, CH$_3$OH).

*Analysis.*—Calcd. for C$_6$H$_{12}$N$_2$: C, 64.28; H, 10.71; N, 24.97. Found: C, 64.54; H, 10.86; N, 24.82.

L-2,6-diazabicyclo(3.3.0)octane dipicrate was prepared from the diamine and picric acid in ethanol and recrystallized from aqueous ethanol as plates, M.P. 279° (dec.).

*Analysis.*—Calcd. for C$_{18}$H$_{18}$O$_{14}$N$_8$: C, 37.90; H, 3.19; N, 19.66. Found: C, 38.14; H, 3.33; N, 19.67.

*Example 5*

L - 2 - benzyl - 2,6 - diazabicyclo(3.3.0)octane (L-XI).—In a hydrogenolysis experiment of L-IX in which the hydrogenation was interrupted before completion, distillation of the product gave a 24% yield of L-X and a 53% yield of L-XI. The monobenzylamine L-XI had B.P. 106° (0.5 mm.), $n_D^{25}$ 1.5470, M.P. 12–15°, $[\alpha]_D^{26}$ 33.4° (C, 3.4, CH$_3$OH).

*Analysis.*—Calcd. for C$_{13}$H$_{18}$N$_2$: C, 77.16; H, 9.02; N, 13.87. Found: C, 77.14; H, 9.28; N, 13.97.

L-2-benzyl - 2,6 - diazabicyclo(3.3.0)octance dipicrate was prepared from the diamine and picric acid in ether and recrystallized from aqueous alcohol as plates, M.P. 227.5° (dec.).

*Analysis.*—Calcd. for C$_{22}$H$_{24}$N$_8$O$_{14}$: C, 45.46; H, 3.67; N, 16.98. Found: C, 45.65; H, 3.86; N, 17.03.

*Example 6*

L - 2,6 - bis(β - hydroxyethyl) - 2,6 - diazabicyclo-(3.3.0)octane (L-XII).—A solution of 7.3 g. of ethanolamine in 20 ml. of dioxane was added slowly to a refluxing solution of 11.7 g. of D-IV in 100 ml. of dioxane over a period of 2 hours. The solution was refluxed for another 3 hours and concentrated to 30 ml. After addition of 40 ml. of 2 N sodium hydroxide the product was extracted with ether continuously for 72 hours. The extract was dried over potassium carbonate, concentrated, and distilled in a short-path distillation apparatus with a bath temperature of 160° (1.0 mm.). The yield of L-XII, a clear viscous liquid, amounted to 1.75 g. (44%), $n_D^{25}$ 1.5180.

*Analysis.*—Calcd. for $C_{10}H_{20}O_2N_2$: C, 59.96; H, 10.06; N, 13.99. Found: C, 59.68; H, 10.17; N, 14.16.

*L - 2,6 - bis(β - hydroxyethyl) - 2,6 - diazabicyclo-(3.3.0)octane dibenzoate* was prepared by heating 1.50 g. of the glycol L-XII with 5 g. of benzoyl chloride in 75 ml. of chloroform under reflux for 7 days. The crystalline mass that separated was collected, dissolved in dilute sodium bicarbonate, and extracted with ether. Evaporation of the ethereal solution afforded the dibenzoate, M.P. 60–62°. It was recrystallized from pentane as prisms, M.P. 65°.

*Analysis.*—Calcd. for $C_{24}H_{28}O_4N_2$: C, 70.56; H, 6.91; N, 6.86. Found: C, 70.78; H, 6.90; N, 7.17.

Example 7

*D - 2,6 - dibenzyl - 2,6 - diazabicyclo(3.3.0)octane (D–VIII).*—This compound was prepared by cyclization of L-IV with benzylamine as described before for the L-isomer in 66% yield, M.P. 37.5–37.8°, $[\alpha]_D$ —63.1° (C, 1.8, $CHCl_3$).

*Analysis.*—Calcd. for $C_{20}H_{24}N_2$: C, 82.15; H, 8.29; N, 9.58. Found: C, 82.03; H, 8.40; N, 9.83.

*D - 2,6 - dibenzyl - 2,6 - diazabicyclo(3.3.0)octane dihydrochloride* was prepared from the diamine D–VIII and hydrogen chloride in ethanol and recrystallized from same solvent as long prisms, M.P. 241.8–243.0°.

*Analysis.*—Calcd. for $C_{20}H_{26}N_2Cl_2$: C, 65.76; H, 7.18; N, 7.69. Found: C, 65.63; H, 7.36; N, 7.75.

The compounds of the invention are useful as monomers as they can be converted to polymers by treatment with $BF_3$. These polymers, which are polybutylene amines, are similar in properties to polyethylene oxides and may be used as molding plastics to make table spoons, for example, or may be used as laminating resins to make plywood, for example.

What is claimed is:

1. A compound which is a member of the group consisting of those having the structures

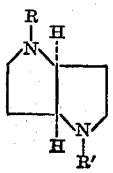

and

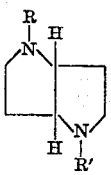

in which R and R' is a member of the group consisting of hydrogen and radicals represented by $(CH_2)_nR''$ in which $n$ is an integer from 1 to 4 and in which R'' is a member of the group consisting of hydrogen, phenyl and hydroxyl.

2. The process for preparing a compound which is a member of the group consisting of those having the structures:

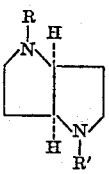

and in which R and R' is a member of the group consisting of lower alkyl radicals having from 1 to 4 carbon atoms, benzyl and β-hydroxyethyl radicals which comprises combining 1,6-dibromohexane-3,4-diol ditosylate and an amine which is a member of the group consisting of lower alkyl amines having from 1 to 4 carbon atoms, benzylamine and ethanolamine.

3. A compound according to claim 1 in which R and R' are butyl radicals.

4. A compound according to claim 1 in which R and R' are methyl radicals.

5. A compound according to claim 1 in which R and R' are benzyl radicals.

6. A compound according to claim 1 in which R and R' are hydrogen radicals.

References Cited in the file of this patent

Chem. Abstracts, vol. 43, Index, page 10967 (1949).
Chem. Abstracts, vol. 45, Index, page 12308 (1951).